US012505797B2

(12) United States Patent
Qiu et al.

(10) Patent No.: US 12,505,797 B2
(45) Date of Patent: Dec. 23, 2025

(54) DISPLAY PANEL, METHOD FOR DRIVING PIXEL CIRCUIT OF DISPLAY PANEL, AND DISPLAY DEVICE

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Yuanyou Qiu, Beijing (CN); Yudiao Cheng, Beijing (CN)

(73) Assignees: CHENGDU BOE OPTOELECTRONICS TECHNOLOGY CO., LTD., Sichuan (CN); BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 18/221,960

(22) Filed: Jul. 14, 2023

(65) Prior Publication Data

US 2023/0360581 A1 Nov. 9, 2023

Related U.S. Application Data

(63) Continuation of application No. 17/441,716, filed as application No. PCT/CN2020/118657 on Sep. 29, 2020, now Pat. No. 11,798,456.

(51) Int. Cl.

*G09G 3/20* (2006.01)

*G09G 3/3233* (2016.01)

(52) U.S. Cl.

CPC ......... *G09G 3/3233* (2013.01); *G09G 3/2092* (2013.01); *G09G 2300/0426* (2013.01);

(Continued)

(58) Field of Classification Search

CPC ............... G09G 3/3233; G09G 3/2092; G09G 2300/0426; G09G 2300/0819;

(Continued)

(56) References Cited

U.S. PATENT DOCUMENTS

2004/0041801 A1* 3/2004 Kida .................... G09G 3/2011 345/204

2006/0267884 A1* 11/2006 Takahashi ............ G09G 3/3233 345/76

(Continued)

FOREIGN PATENT DOCUMENTS

CN 103778883 A 5/2014

CN 104409047 A 3/2015

(Continued)

OTHER PUBLICATIONS

International search report of PCT application No. PCT/CN2020/118657 issued on Jun. 24, 2021.

(Continued)

*Primary Examiner* — Jose R Soto Lopez

(74) *Attorney, Agent, or Firm* — Lippes Mathias LLP

(57) ABSTRACT

A display panel including: a base substrate which includes a display region and a non-display region on at least one side of the display region, the display region includes a first display region and a second display region having a resolution higher than that of the first display region, and the non-display region includes a pixel circuit region; a plurality of first light-emitting elements in the first display region; and a plurality of first pixel circuits in the pixel circuit region, where orthographic projections of the plurality of first pixel circuits and orthographic projections of the plurality of first light-emitting elements on the base substrate are not overlapped with one another.

18 Claims, 11 Drawing Sheets

(52) U.S. Cl.
CPC ............... *G09G 2300/0819* (2013.01); *G09G 2300/0842* (2013.01); *G09G 2300/0861* (2013.01); *G09G 2310/08* (2013.01); *G09G 2320/0233* (2013.01); *G09G 2330/028* (2013.01); *G09G 2360/145* (2013.01)

(58) Field of Classification Search
CPC ... G09G 2300/0842; G09G 2300/0861; G09G 2310/08; G09G 2320/0233; G09G 2330/028; G09G 2360/145; G09G 2300/0852; G09G 2330/00; G09G 2340/0407
See application file for complete search history.

(56) References Cited

U.S. PATENT DOCUMENTS

| | | | | |
|---|---|---|---|---|
| 2010/0079361 | A1 | 4/2010 | Lee et al. | |
| 2012/0038605 | A1 | 2/2012 | Han et al. | |
| 2013/0043802 | A1* | 2/2013 | Han | G09G 3/3233 315/240 |
| 2013/0063041 | A1* | 3/2013 | Kimura | H10D 86/441 315/291 |
| 2013/0222356 | A1 | 8/2013 | Jeong et al. | |
| 2015/0062192 | A1* | 3/2015 | Kim | G09G 3/3233 345/690 |
| 2015/0077412 | A1* | 3/2015 | Nakamura | G09G 3/2007 345/212 |
| 2015/0187273 | A1 | 7/2015 | Chang et al. | |
| 2016/0104423 | A1* | 4/2016 | Park | G09G 3/3233 345/78 |
| 2016/0125809 | A1* | 5/2016 | Hwang | G09G 3/3258 345/212 |
| 2016/0140897 | A1* | 5/2016 | Park | G09G 3/3233 345/77 |
| 2016/0171930 | A1 | 6/2016 | Song et al. | |
| 2016/0314742 | A1 | 10/2016 | Zhou | |
| 2017/0011687 | A1* | 1/2017 | Li | G09G 3/3258 |
| 2017/0039955 | A1* | 2/2017 | Park | G09G 3/3233 |
| 2017/0069263 | A1 | 3/2017 | Hu | |
| 2017/0186368 | A1* | 6/2017 | Hirai | H10K 59/1216 |
| 2017/0243537 | A1* | 8/2017 | Wu | G09G 3/3233 |
| 2017/0270853 | A1* | 9/2017 | Xiang | G09G 3/3258 |
| 2017/0270867 | A1 | 9/2017 | Zhu et al. | |
| 2017/0278457 | A1* | 9/2017 | Zhu | G09G 3/3233 |
| 2017/0365218 | A1* | 12/2017 | Jeong | H10K 59/123 |
| 2018/0005576 | A1* | 1/2018 | Yoon | G09G 3/3233 |
| 2018/0006263 | A1* | 1/2018 | Yoon | H10K 59/80516 |
| 2018/0025696 | A1 | 1/2018 | Su et al. | |
| 2018/0090067 | A1 | 3/2018 | Oh et al. | |
| 2019/0377923 | A1 | 12/2019 | Chen et al. | |
| 2020/0066212 | A1* | 2/2020 | Kim | G09G 3/3266 |
| 2020/0169680 | A1 | 5/2020 | Park et al. | |
| 2020/0243014 | A1* | 7/2020 | Zhu | G09G 3/3266 |
| 2020/0319682 | A1 | 10/2020 | Moon et al. | |
| 2021/0118371 | A1 | 4/2021 | Qing et al. | |
| 2021/0134227 | A1* | 5/2021 | Im | G09G 3/3266 |
| 2021/0158750 | A1 | 5/2021 | Xiang et al. | |
| 2021/0201762 | A1* | 7/2021 | He | H10H 29/142 |
| 2021/0287603 | A1 | 9/2021 | Liu et al. | |
| 2021/0304663 | A1 | 9/2021 | Kim | |
| 2021/0327972 | A1 | 10/2021 | Lou et al. | |
| 2021/0335167 | A1* | 10/2021 | Lee | G09G 3/2092 |
| 2021/0358379 | A1 | 11/2021 | Li et al. | |
| 2021/0407412 | A1* | 12/2021 | Kim | G09G 3/3258 |
| 2021/0407436 | A1 | 12/2021 | Park et al. | |
| 2022/0068211 | A1* | 3/2022 | Jeong | H10K 59/123 |
| 2022/0123094 | A1 | 4/2022 | Qiu et al. | |
| 2022/0139335 | A1 | 5/2022 | Lee et al. | |
| 2022/0199010 | A1* | 6/2022 | Zhao | G09G 3/3225 |
| 2022/0309970 | A1 | 9/2022 | Yu et al. | |

FOREIGN PATENT DOCUMENTS

| | | | |
|---|---|---|---|
| CN | 104751784 | A | 7/2015 |
| CN | 106157880 | A | 11/2016 |
| CN | 106531074 | A | 3/2017 |
| CN | 106991964 | A | 7/2017 |
| CN | 107564470 | A | 1/2018 |
| CN | 107610635 | A | 1/2018 |
| CN | 108492782 | A | 9/2018 |
| CN | 108806578 | A | 11/2018 |
| CN | 109215582 | A | 1/2019 |
| CN | 110047432 | A | 7/2019 |
| CN | 110767157 | A | 2/2020 |
| CN | 110858471 | A | 3/2020 |
| CN | 111028757 | A | 4/2020 |
| CN | 111063719 | A | 4/2020 |
| CN | 111179855 | A | 5/2020 |
| CN | 111326560 | A | 6/2020 |
| CN | 111402814 | A | 7/2020 |
| CN | 111508377 | A | 8/2020 |
| KR | 20160070642 | A | 6/2016 |
| KR | 20200060118 | A | 5/2020 |

OTHER PUBLICATIONS

International search report of PCT application No. PCT/CN2020/120484 issued on Jun. 28, 2021.
China National Intellectual Property Administration, First office action of Chinese application No. 202080002169.4 issued on Apr. 22, 2023, which is foreign counterpart application of this US application.
Non-final office Action of U.S. Appl. No. 17/426,681 issued on May 3, 2023.
Non-final office Action of U.S. Appl. No. 17/441,716 issued on Mar. 2, 2023.
Notice of allowance of U.S. Appl. No. 17/441,716 issued on Jun. 28, 2023.
Final office Action of U.S. Appl. No. 17426,681 issued on Nov. 9, 2023.
Notice of allowance of U.S. Appl. No. 17426,681 issued on Jan. 4, 2024.
China National Intellectual Property Administration, Second office action of Chinese application No. 202080002169.4 issued on Dec. 21, 2023, which is foreign counterpart application of this US application.

* cited by examiner

DISPLAY PANEL, METHOD FOR DRIVING PIXEL CIRCUIT OF DISPLAY PANEL, AND DISPLAY DEVICE

CROSS-REFERENCE TO RELATED APPLICATION

This application is a continuation of U.S. patent application Ser. No. 17/441,716, filed Sep. 22, 2021, which is a 371 of PCT Application No. PCT/CN2020/118657, filed on Sep. 29, 2020, the entire contents of which are incorporated herein by reference.

TECHNICAL FIELD

The present disclosure relates to the field of display technologies, and in particular, to a display panel, a method for driving a pixel circuit of the display panel, and a display device.

BACKGROUND

At present, in order to increase a screen-to-body ratio of a display device, a display panel of the display device is provided with a light-transmittable display region, so that an optical device (such as a camera) may be disposed under the light-transmittable display region.

SUMMARY

In a first aspect, a display panel is provided. The display panel includes:

a base substrate having a display region and a non-display region on at least one side of the display region, where the display region includes a first display region and a second display region having a resolution higher than that of the first display region, and the non-display region includes a pixel circuit region;

a plurality of first light-emitting elements in the first display region; and a plurality of first pixel circuits in the pixel circuit region, where orthographic projections of the plurality of first pixel circuits and orthographic projections of the plurality of first light-emitting elements on the base substrate are not overlapped with one another, where at least one of the plurality of first pixel circuits is connected with at least one of the plurality of first light-emitting elements through at least one conductive wire; the at least one first pixel circuit is connected with a first initial power source terminal and a second power initial source terminal respectively; the first initial power source terminal is configured to provide a first initial power source signal and the second initial power source terminal is configured to provide a second initial power source signal so as to reset the first light-emitting element; and a potential of the second initial power source signal is higher than a potential of the first initial power source signal and is lower than a turn-on voltage of the first light-emitting element.

In second aspect, a method for driving a pixel circuit is provided. The pixel circuit is the first pixel circuit in the display panel as described in the above aspect, and the method includes:

outputting, by the first pixel circuit, a second initial power source signal provided by a second initial power source terminal to a first light-emitting element connected with the first pixel circuit in a reset phase; and outputting, by the first pixel circuit, a driving signal to the first light-emitting element connected with the first pixel circuit in response to a first initial power source signal provided by a first initial power source terminal in a light-emitting phase, where a potential of the second initial power source signal is higher than a potential of the first initial power source signal and lower than a turn-on voltage of the first light-emitting element.

In a third aspect, a display device is provided. The display device includes a driving circuit and the display panel as described in the above aspect. The display panel includes a plurality of first pixel circuits; and the driving circuit is connected with at least one of the plurality of first pixel circuits and is configured to drive the at least one first pixel circuit to operate.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION

Figure 1:
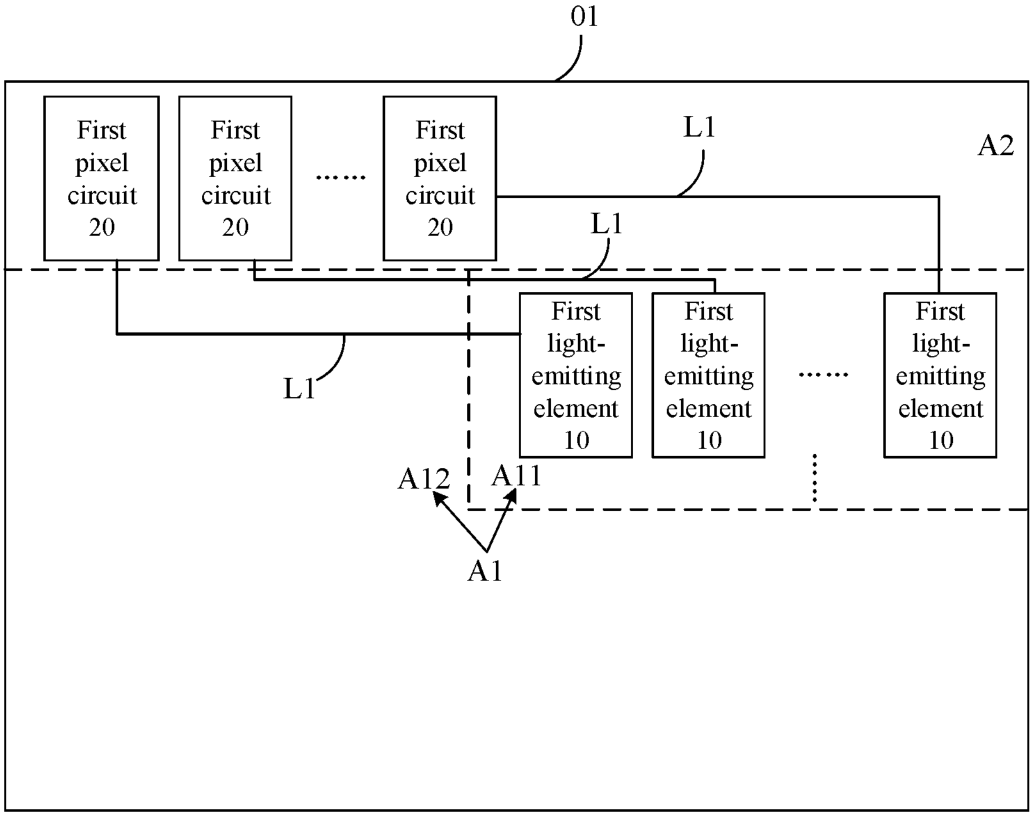
FIG. 1 is a structural schematic diagram of a display panel according to an embodiment of the present disclosure.

In the related art, in order to ensure the light transmittance of the light-transmittable display region, generally, only a plurality of light-emitting elements are disposed in the light-transmittable display region and a plurality of pixel circuits which drive the plurality of light-emitting elements to emit light are generally located in other regions except the light-transmittable display region, such as a pixel circuit region specially used for arranging the pixel circuits. Each pixel circuit may be connected with one light-emitting element through a conductive wire.

However, due to the influence of the parasitic capacitance on the conductive wire, there will be a certain extent of delay in a turn-on time of the light-emitting element located in the light-transmittable display region. As a result, the risk of screen flickering of the display panel easily occurs.

The present disclosure provides a display panel, a method for driving a pixel circuit of the display panel, and a display device. The technical solutions are as follows.

For clearer descriptions of the objectives, technical solutions and advantages in the present disclosure, the embodiments of the present disclosure are described in further detail below with reference to the accompanying drawings.

Transistors used in all embodiments of the present disclosure may be thin film transistors, or field effect transistors, or other devices having the same properties. According to the function of the transistors in a circuit, the transistors used in the embodiments of the present disclosure mainly are switching transistors. Since a source and a drain of the switching transistor used here are symmetrical, the source and drain of the switching transistor are interchangeable. In the embodiment of the present disclosure, the source is called a first electrode and the drain is called a second electrode; or the drain is called the first electrode and the source is called the second electrode. Based on a form in the figure, it is stipulated that for the transistor, a middle terminal is a gate, a signal input terminal is the source, and a signal output terminal is the drain. In addition, the switching transistor used in the embodiment of the present disclosure may include any one of a P-type switching transistor and an N-type switching transistor. The P-type switching transistor is turned on when the gate is at a low level, and is turned off when the gate is at a high level. The N-type switching transistor is turned on when the gate is at a high level, and is turned off when the gate is at a low level.

In a display panel having a light-transmittable display region, one end of a light-emitting element in this light-transmittable display region (such as an anode) is connected with a pixel circuit through a conductive wire (such as a transparent conductive wire) and the other end (such as a cathode) is connected with a power source terminal (such as a VSS terminal providing a low level). When a voltage difference between a driving signal output by the pixel circuit to the light-emitting element and a power source signal provided by the power source terminal connected with the light-emitting element, i.e., a voltage difference between the cathode end and anode end of the light-emitting element reaches a turn-on voltage, the light-emitting element may emit light.

However, due to the existence of parasitic capacitance on the conductive wire, it takes a longer time for the voltage difference between the two ends of the light-emitting element to reach the turn-on voltage. Thus, in a scanning time of one frame, the light-emitting element always emits light after a delay of a few milliseconds, that is, the light-emitting element has the phenomenon of light-emitting delay. Especially for a low-gray-scale picture, the phenomenon of delay is more obvious because a potential itself of the driving signal is lower. In addition, since lengths of conductive wires connected between different light-emitting elements and pixel circuits are different and the longer the conductive wire is, the higher the parasitic capacitance is, the light-emitting times of different light-emitting elements are different. In this case, when the light-emitting delay time is longer, the phenomenon of screen flickering will occur on the display panel and the risk of screen flickering is larger.

An embodiment of the present disclosure provides a new display panel. In this display panel, a voltage difference between two ends of a light-emitting element in a light-transmittable display region can quickly reach a turn-on voltage in a light-emitting phase, that is, the phenomenon of light-emitting delay does not exist. Thus, the display panel has a lower risk of screen flickering.

FIG. 1 is a structural schematic diagram of a display panel according to an embodiment of the present disclosure. As shown in FIG. 1, the display panel includes a base substrate 01. The base substrate 01 has a display region A1 and a non-display region on at least one side (for example, an upper side as shown in the figure) of the display region A1. The non-display region may include a pixel circuit region A2, and the display region may include a first display region A11 and a second display region A12.

An area of the second display region A12 may be much greater than an area of the first display region A11. In this case, a resolution of the second display region A12 may be higher than a resolution of the first display region A11. Since the resolution of the second display region A12 is higher than the resolution of the first display region A11, a larger part of a display picture may be displayed in the second display region A12. Thus, the second display region A12 may also be called a main display region. In addition, the first display region A11 may be a light-transmittable display region that may transmit light, that is, a region where the first display region A11 is located may transmit light. In this case, some photosensitive elements (such as a camera and a fingerprint identification device) required for the display device may be disposed in the first display region A11 so as to lay a foundation for narrow frame design of the display panel. The second display region A12 may be a light-non-transmittable display region. For example, the first display region A11 may be a transparent display region and the second display region A12 may be a non-transparent display region.

With continued reference to FIG. 1, the display panel may further include a plurality of first light-emitting elements 10 in the first display region A11 and a plurality of first pixel circuits 20 in the pixel circuit region A2. The plurality of first pixel circuits 20 may provide signals for the plurality of first light-emitting elements 10 so as to drive the plurality of first light-emitting elements 10 to emit light.

In some embodiments, since the plurality of first pixel circuits 20 and the plurality of first light-emitting elements 10 are located in different regions, orthographic projections of the plurality of first pixel circuits 20 on the base substrate 01 are not overlapped with orthographic projections of the plurality of first light-emitting elements 10 on the base substrate 01. That is, the plurality of first pixel circuits 20 and the plurality of first light-emitting elements 10 do not have any overlapping area in a direction perpendicular to the display panel. In this case, an aperture ratio of the first display region A11 may be ensured, so that the first display region A11 has a better light-transmitting effect.

Figure 2:
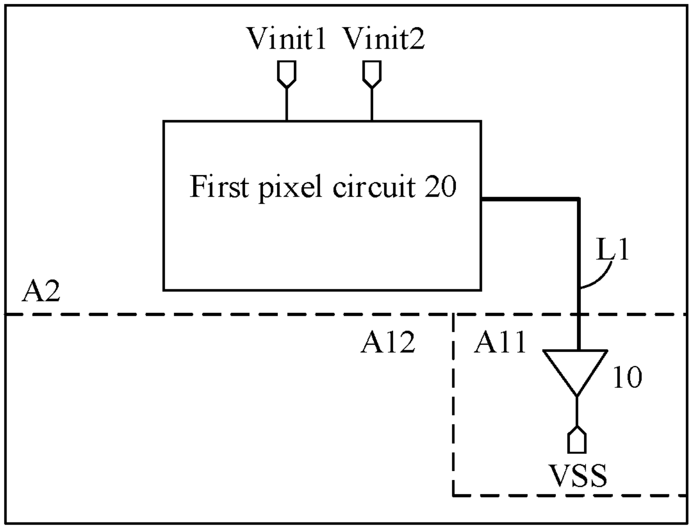
FIG. 2 is a structural schematic diagram of another display panel according to an embodiment of the present disclosure.

In addition, since the first pixel circuits 20 and the first light-emitting elements 10 are not in the same region, at least one of the plurality of first pixel circuits 20 may be connected with at least one of the plurality of first light-emitting elements 10 through at least one conductive wire L1. Moreover, the at least one first pixel circuit 20 may further be connected with a first initial power source terminal Vinit1 and a second initial power source terminal Vinit2 respectively. The first initial power source terminal Vinit1 may be configured to provide a first initial power source signal, and the second initial power source terminal Vinit2 may be configured to provide a second initial power source signal so as to reset one end (such as an anode) of the first light-emitting element 10. Moreover, the first pixel circuit 20 may output a driving signal to one end (such as the anode) of the first light-emitting element 10 in response to the first initial power source signal and other signals (such as a gate driving signal and a data signal) so as to drive the first light-emitting element 10 to emit light. In addition, the other end (such as a cathode) of each light-emitting element 10 may further be connected with a power source terminal VSS. The first pixel circuit connected with the two initial power source terminals may also be called a double-Vinit pixel circuit. Exemplarily, FIG. 2 shows a structural schematic diagram of a pixel structure with an example that one first pixel circuit 20 is connected with one first light-emitting element 10.

In the embodiment of the present disclosure, a potential of the second initial power source signal may be higher than a potential of the first initial power source signal and lower than a turn-on voltage of the first light-emitting element 10. It is assumed that as shown in FIG. 2, one end of the first light-emitting element 10 connected with the first pixel circuit 20 is the anode of the first light-emitting element 10, the process of driving the first light-emitting element 10 to emit light is that the second initial power source terminal Vinit2 is firstly controlled to output the second initial power source signal to the anode of the first light-emitting element 10, and an initial potential of the anode of the first light-emitting element 10 may be the potential of the second initial power source signal (this process may be call a reset phase) in this case. Next, the driving signal is output in response to the first initial power source signal provided by the first initial power source terminal Vinit1, and other signals. At this time, the potential of the anode of the first light-emitting element 10 may rise constantly from the potential of the second initial power source signal. When the potential of the anode of the first light-emitting element 10 rises to a potential at which the voltage difference between the anode and the cathode reaches the turn-on voltage, i.e., a potential required for turn-on, the first light-emitting element 10 may emit light (this process may be called a light-emitting phase).

It can be seen from the principle of controlling the first light-emitting element 10 to emit light that by setting the potential of the second initial power source signal to be higher than the potential of the first initial power source signal, the initial potential of one end of the first light-emitting element 10 connected with the second pixel circuit 20 may be higher than the initial potential in the pixel circuit in which the second initial power source signal terminal is not disposed in the reset phase, and thus the potential may quickly rise to the potential required for turn-on in the light-emitting phase, thereby solving the problem of light-emitting delay due to the influence of the parasitic capacitance on the conductive wire. In addition, by setting the potential of the second initial power source signal to be lower than the turn-on voltage of the first light-emitting element 10, it can effectively avoid the phenomenon that a light-emitting error occurs because the voltage difference between the two ends of the first light-emitting element 10 reaches the turn-on voltage before arrival of the driving signal, i.e., in the reset stage.

Optionally, in some embodiments, the plurality of first pixel circuits 20 are in one-to-one correspondence with the plurality of first light-emitting elements 10 in terms of an electrical connection relationship. That is, each first pixel circuit 20 may be connected with one first light-emitting element 10 through one conductive wire L1 and the first light-emitting elements 10 connected with various first pixel circuits 20 are different. The embodiment of the present disclosure does not limit the connecting relationship.

In summary, the display panel according to the embodiment of the present disclosure includes the first light-emitting element in the first display region and the first pixel circuit which is connected with the first light-emitting element through the conductive wire and is configured to drive the first light-emitting element to emit light. Since the first pixel circuit is connected with the two initial power source terminals and the potential of the signal provided by the second initial power source terminal configured to reset the first light-emitting element is higher than the potential of the signal provided by the other initial power source terminal, before light emitting, the potential of one end of the first light-emitting element is higher than the potential when the second initial power source terminal is not disposed, and further during light emitting, the voltage difference between two ends of the first light-emitting element can quickly reach the turn-on voltage. In this case, the problem of light-emitting delay due to the influence of the parasitic capacitance on the conductive wire is solved and the risk of screen flickering is reduced.

In some embodiments, a voltage value of the first initial power source signal is in the range of approximately −5 to −1 V. In some embodiments, a difference obtained by subtracting a voltage value of a signal provided by the VSS terminal from a voltage value of the second initial power source signal is less than a turn-on voltage of an OLED. In some embodiments, the turn-on voltage of the first light-emitting element is approximately 1.2 to 1.8 V. In some embodiments, the voltage value of the signal provided by the VSS terminal is approximately −5 to −2.5 V. In some embodiments, the voltage value of the second initial power source signal is approximately −0.7 to −3.8 V. The term "approximate value" here refers to a value that is allowed to float up and down within the range of process and measurement error without strictly defining the limit.

As an optional embodiment, the second initial power source terminal Vinit2 according to the embodiment of the present disclosure may be an alternating current power source terminal. In this case, the second initial power source terminal Vinit2 may be controlled to provide the second initial power source signal only in the reset phase, but not to provide the second initial power source signal in other phase (such as the light-emitting phase). For example, the potential of the second initial power source signal may be controlled to be the same as the potential of the power source signal provided by the power source terminal (such as VSS) connected with the other end of the first light-emitting element 10 in other phase.

By setting the second initial power source terminal Vinit2 as the alternating current power source terminal, it can avoid the phenomenon that the light-emitting error occurs because the voltage difference between the two ends of the first light-emitting element 10 reaches the turn-on voltage due to electric leakage of the transistor (such as the driving transistor) in the first pixel circuit 20 in the non-light-emitting phase. That is, the phenomenon of abnormal display is avoided.

In addition, if the second initial power source terminal Vinit2 is the alternating current power source terminal, the first initial power source terminal Vinit1 and the second initial power source terminal Vinit2 may be set to be shared and the shared initial power source terminal is controlled to flexibly output initial power source signals with different potentials in different phases. Thus, the wiring is simplified and the cost is saved.

As another optional embodiment, the second initial power source terminal Vinit2 according to the embodiment of the present disclosure may be a direct current power source terminal. In this case, the second initial power source terminal Vinit2 may be controlled to provide the second initial power source signal in various phases (including the reset phase and the light-emitting phase).

It should be noted that the potential of the second initial power source signal provided by the second initial power source terminal Vinit2 according to the embodiment of the present disclosure may also be dynamically adjusted based on the picture displayed currently. Optionally, the driving circuit that controls the pixel circuit to operate may detect the picture displayed currently by the display panel and flexibly adjust the second initial power source signal based on a detection result. In this case, the better display effect may be further ensured.

For example, if the picture displayed by the display panel currently is a low-gray-scale picture, the driving circuit may determine that the potential of the driving signal output by the first pixel circuit 20 is lower. Correspondingly, for making the potential of one end of the first light-emitting element 10 connected with the first pixel circuit 20 to quickly reach the potential required for turn-on, the driving circuit may control the potential of the second initial power source signal to be higher than the potential when the second initial power source terminal is not disposed. Conversely, if the picture displayed currently is a high-gray-scale picture, the driving circuit may determine that the potential of the driving signal output by the first pixel circuit 20 is higher. Correspondingly, the driving circuit may control the potential of the second initial power source signal to be higher than the potential when the second initial power source terminal is not disposed, but lower than the potential when the low-gray-scale picture is displayed. A gray-scale value of the low-gray-scale picture is less than that of the high-gray-scale picture.

Figure 3:
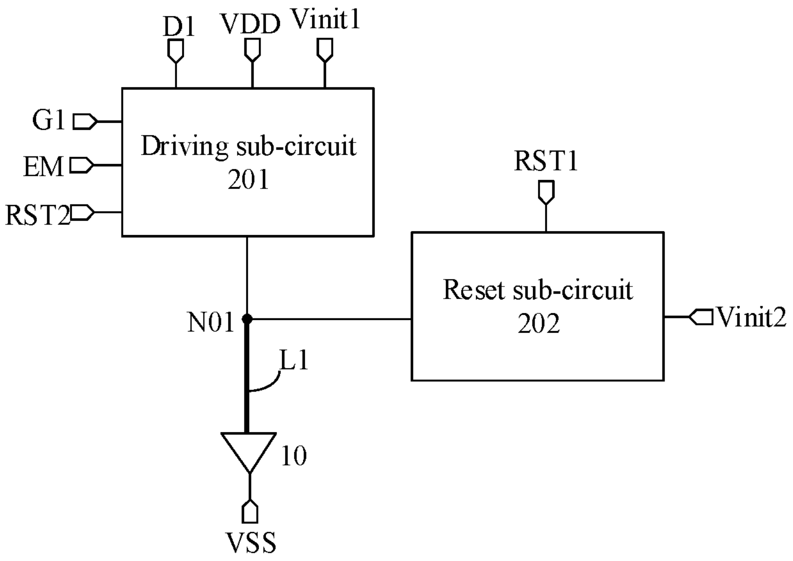
FIG. 3 is a structural schematic diagram of a first pixel circuit according to an embodiment of the present disclosure.

FIG. 3 is a structural schematic diagram of a first pixel circuit according to an embodiment of the present disclosure. As shown in FIG. 3, each first pixel circuit 20 may further be connected with a gate signal terminal G1, a light-emitting control signal terminal EM, a direct current signal terminal VDD, a data signal terminal D1, a reset signal terminal RST1 and a pull-down control terminal RST2. The first pixel circuit 20 connected with the first light-emitting element 10 may include a driving sub-circuit 201 and a reset sub-circuit 202.

The driving sub-circuit 201 may be connected with the gate signal terminal G1, the data signal terminal D1, the light-emitting control signal terminal EM, the direct current signal terminal VDD, the pull-down control terminal RST2, the first initial power source terminal Vinit1 and a target node N01, respectively. The driving sub-circuit 201 may output a driving signal to the target node N01 in response to a gate driving signal provided by the gate signal terminal G1, a data signal provided by the data signal terminal D1, a light-emitting control signal provided by the light-emitting control signal terminal EM, a direct current signal provided by the direct current signal terminal VDD, a pull-down control signal provided by the pull-down control terminal RST2 and the first initial power source signal.

The reset sub-circuit 202 may be connected with the reset signal terminal RST1, the second initial power source terminal Vinit2 and the target node N01, respectively. The reset sub-circuit 202 may output the second initial power source signal to the target node N01 in response to a reset signal provided by the reset signal terminal RST1.

The first light-emitting element 10 may be connected with the target node N01 through the conductive wire L1.

Figure 4:
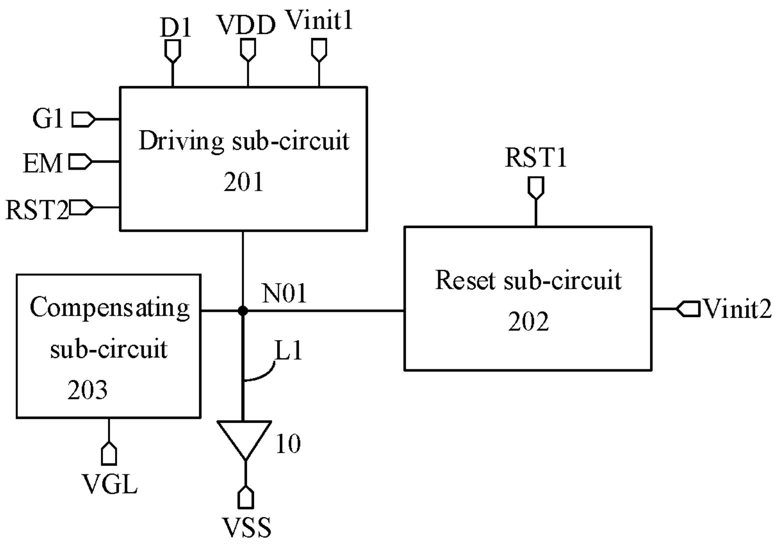
FIG. 4 is a structural schematic diagram of another first pixel circuit according to an embodiment of the present disclosure.

Optionally, in conjunction with another first pixel circuit shown in FIG. 4, the first pixel circuit 20 connected with the first light-emitting element 10 according to the embodiment of the present disclosure may further include a compensating sub-circuit 203.

The compensating sub-circuit 203 may be connected with a voltage-stabilized power source terminal VGL and the target node N01 respectively, and may be configured to compensate for a potential of the target node N01 based on a voltage-stabilized signal provided by the voltage-stabilized power source terminal VGL. For example, the voltage-stabilized power source terminal VGL may be a grounding terminal.

Figure 5:
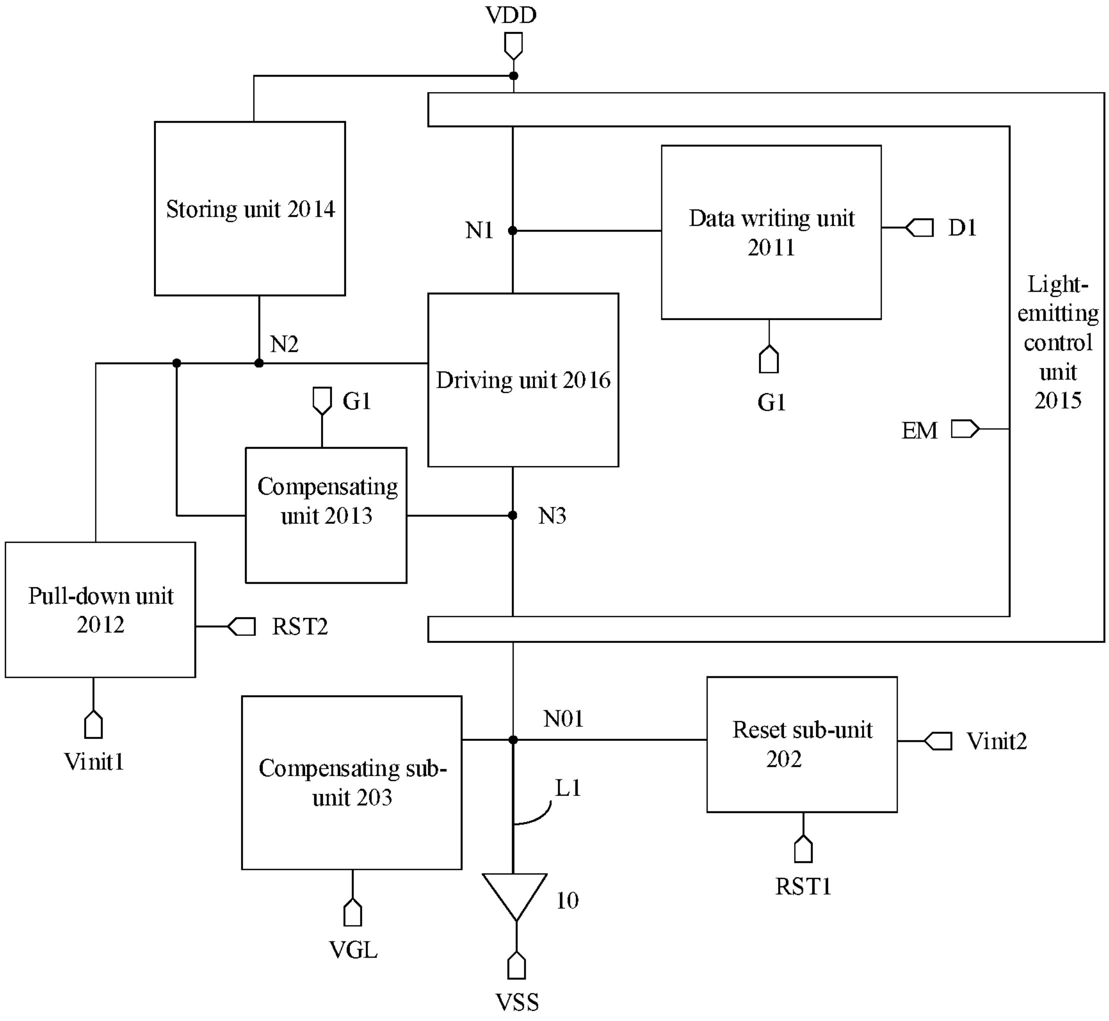
FIG. 5 is a structural schematic diagram of a further first pixel circuit according to an embodiment of the present disclosure.

Optionally, FIG. 5 is a structural schematic diagram of a further first pixel circuit according to an embodiment of the present disclosure. As shown in FIG. 5, the driving sub-circuit 201 may include a data writing unit 2011, a pull-down unit 2012, a compensating unit 2013, a storing unit 2014, a light-emitting control unit 2015, and a driving unit 2016.

The data writing unit 2011 may be connected with the gate signal terminal G1, the data signal terminal D1 and a first node N1 respectively, and may be configured to control an on-off state of the data signal terminal D1 and the first node N1 in response to the gate driving signal.

For example, the data writing unit 2011 may control the first node N1 to be communicated to the data signal terminal D1 when the potential of the gate driving signal is the first potential. At this time, the data signal terminal D1 may output the data signal to the first node N1 through a data writing transistor T1. The data writing unit 2011 may control the first node N1 to be disconnected from the data signal terminal D1 when the potential of the gate driving signal provided by the gate signal terminal G1 is the second potential. Optionally, the first potential may be a valid potential and the second potential may be an invalid potential, and the first potential may be a low potential relative to the second potential.

The pull-down unit 2012 may be connected with the pull-down control terminal RST2, the first initial power source terminal Vinit1, and a second nodeN2 respectively, and may be configured to control an on-off state of the first initial power source terminal Vinit1 and the second node N2 in response to the pull-down control signal.

For example, the pull-down unit 2012 may control the second node N2 to be communicated to the first initial power source terminal Vinit1 when the potential of the pull-down control signal provided by the pull-down control terminal RST2 is the first potential. At this time, the first initial power source terminal Vinit1 may output the first initial power source signal at the second potential to the second node through a pull-down transistor T2 to achieve noise reduction of the second node N2. The pull-down unit 2012 may control the second node N2 to be disconnected from the first initial power source terminal Vinit1 when the potential of the pull-down control signal provided by the pull-down control terminal RST2 is the second potential.

The compensating unit 2013 may be connected with the gate signal terminal G1, a third node N3, and the second node N2 respectively, and may be configured to adjust a potential of the second node N2 based on a potential of the third node N3 in response to the gate driving signal.

The storing unit 2014 may be connected with the direct current signal terminal VDD and the second node N2 respectively, and may be configured to control the potential of the second node N2 based on the direct current signal.

The light-emitting control unit 2015 may be connected with the light-emitting control signal terminal EM, the direct current signal terminal VDD, the first node N1, the third node N3, and the target node N01 respectively, and may be configured to control an on-off state of the direct current signal terminal VDD and the first node N1 as well as an on-off state of the third node N3 and the target node N01 in response to the light-emitting control signal.

For example, the light-emitting control unit 2015 may control the first node N1 to be communicated to the direct current signal terminal VDD when the potential of the light-emitting control signal is the first potential. At this time, the direct current signal terminal VDD may output the direct current power source signal to the first node N1 through a light-emitting control transistor T4. In addition, the light-emitting control unit 2015 may control the third node N3 to be communicated to the target node N01. The light-emitting control unit 2015 may control the first node N1 to be disconnected from the direct current signal terminal VDD and control the third node N3 to be disconnected from the target node N01, when the potential of the light-emitting control signal is the second potential.

The driving unit 2016 may be connected with the second node N2, the first node N1, and the third node N3 respectively, and may be configured to output the driving signal to the third node N3 based on the potential of the second node N2 and the potential of the first node N1.

For example, the driving unit 2016 may output a driving current to the third node N3 based on the potential of the second node N2 and the potential of the first node N1. Correspondingly, when the light-emitting control unit 2015 controls the third node N3 to be connected to the target node N01, the driving current may be output to the target node N01 through the light-emitting control unit 2015.

Figure 6:
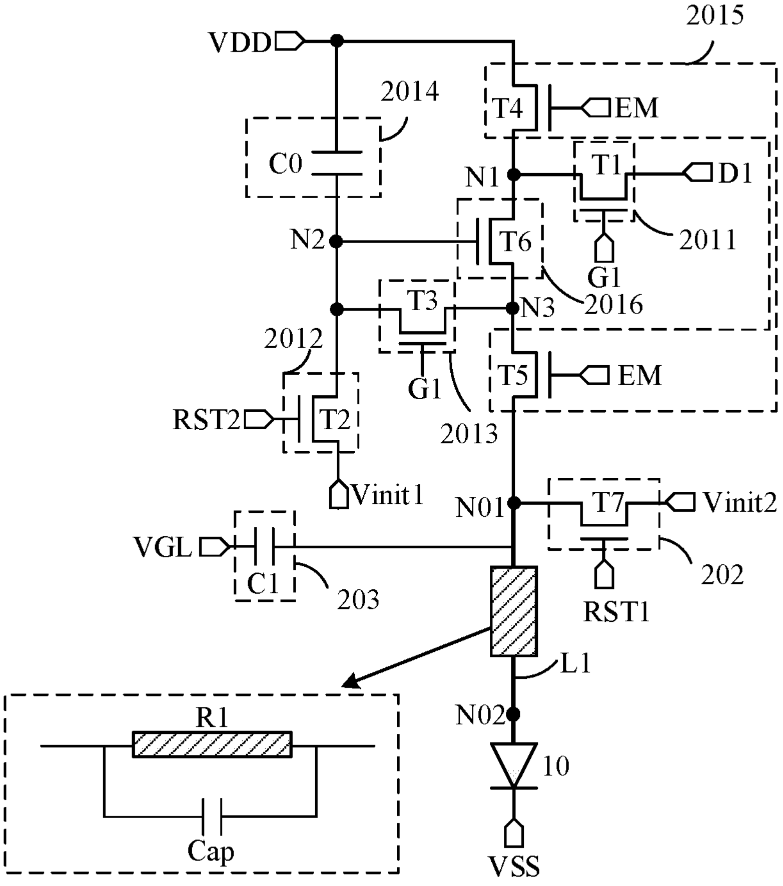
FIG. 6 is a structural schematic diagram of a still further first pixel circuit according to an embodiment of the present disclosure.

FIG. 6 is a structural schematic diagram of a still further first pixel circuit according to an embodiment of the present disclosure. As shown in FIG. 6, the compensating sub-circuit 203 may include a compensating capacitor C1. The compensating capacitor C1 may have one end connected with the target node N01 and the other end connected with the voltage-stabilized power source terminal VGL.

By setting the compensating capacitor C1, the parasitic capacitance on the transparent conductive wire L1 can be effectively compensated, and on the other hand, it shortens the time for the voltage difference between the two ends of the first light-emitting element 10 to reach the turn-on voltage. Optionally, a capacitance value of the compensating capacitor C1 may be set to be smaller relative to the parasitic capacitance on the conductive wire L1, so that certain compensation value deviation range may be reserved.

With continued reference to the first pixel circuit shown in FIG. 6, the data writing unit 2011 may include the data writing transistor T1. The pull-down unit 2012 may include the pull-down transistor T2. The compensating unit 2013 may include a compensating transistor T3. The light-emitting control unit 2014 may include a first light-emitting control transistor T4 and a second light-emitting control transistor T5. The storing unit 2015 may include a storing capacitor C0. The driving unit 2016 may include a driving transistor T6. The reset sub-circuit 202 may include a reset transistor T7.

A gate of the data writing transistor T1 may be connected with the gate signal terminal G1, a first electrode may be connected with the data signal terminal D1, and a second electrode may be connected with the first electrode N1.

Agate of the pull-down transistor T2 may be connected with the pull-down control terminal RST2, a first electrode may be connected with the first initial power source terminal Vinit1, and a second electrode may be connected with the second node N2.

A gate of the compensating transistor T3 may be connected with the gate signal terminal G1, a first electrode may be connected with the third node N3, and a second electrode may be connected with the second node N2.

Both a gate of the first light-emitting control transistor T4 and a gate of the second light-emitting control transistor T5 are connected with the light-emitting control signal terminal EM, a first electrode of the first light-emitting control transistor T4 is connected with the direct current signal terminal VDD and a second electrode of the first light-emitting control transistor T4 is connected with the first node N1, and a first electrode of the second light-emitting control transistor T5 is connected with the third node N3 and a second electrode of the second light-emitting control transistor T5 is connected with the target node N01.

One end of the compensating capacitor C0 may be connected with the second node N1, and the other end of the compensating capacitor C0 may be connected with the direct current signal terminal VDD.

A gate of the driving transistor T6 may be connected with the second node N2, a first electrode of the driving transistor T6 may be connected with the first node N1 and a second electrode of the driving transistor T6 may be connected with the third node N3.

A gate of the reset transistor T7 may be connected with the reset signal terminal RST1, a first electrode of the reset transistor T7 may be connected with the second initial power source terminal Vinit2, and a second electrode of the reset transistor T7 may be connected with the target node N01.

Figure 7:
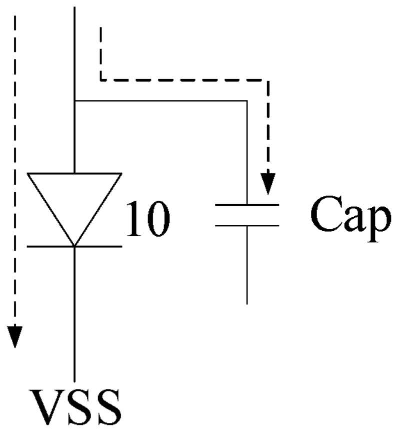
FIG. 7 is a schematic diagram showing a flow direction of a driving signal according to an embodiment of the present disclosure.

In addition, with reference to FIG. 6, it can be seen that a connecting wire between the target node N01 and the anode of the first light-emitting element 10 (i.e., the node N02 shown in FIG. 5) is the conductive wire L1. The loadings on the conductive wire L1 include a parasitic capacitor Cap and a parasitic resistor R1 which are connected in parallel. In conjunction with the diagram of a flow direction of a driving current shown in FIG. 7, it can be seen that a charge in the driving signal flows to the parasitic capacitor Cap firstly, thereby making the potential of the node N02 constantly rise. Thus, it can further be determined that the greater the capacitance value of the parasitic capacitor Cap, the lower the rising rate of the potential of the node N02, that is, the longer the time when the potential of the anode of the first light-emitting element 10 reaches the potential required for turn-on. It should be noted that FIG. 6 only schematically shows a type of first pixel circuit, and the embodiment of the present disclosure does not limit the specific structure of the first pixel circuit. That is, the first pixel circuit may be of a 7T2C (i.e., 7 transistors and 2 capacitors) structure as shown in FIG. 6, or other structures, such as 4T2C structure.

Exemplarily, that the capacitance value c of the parasitic capacitor Cap on the conductive wire L1 is 1.5 picofarads (pF), the resistance value r of the parasitic resistor R1 is 300 kilo-ohms (kΩ), and both the potential v1 of the first initial power source signal and the potential v2 of the power source signal provided by the VSS are −3 volts (v) in the first pixel circuit 20 shown in FIG. 6 is taken as example.

Figure 8:
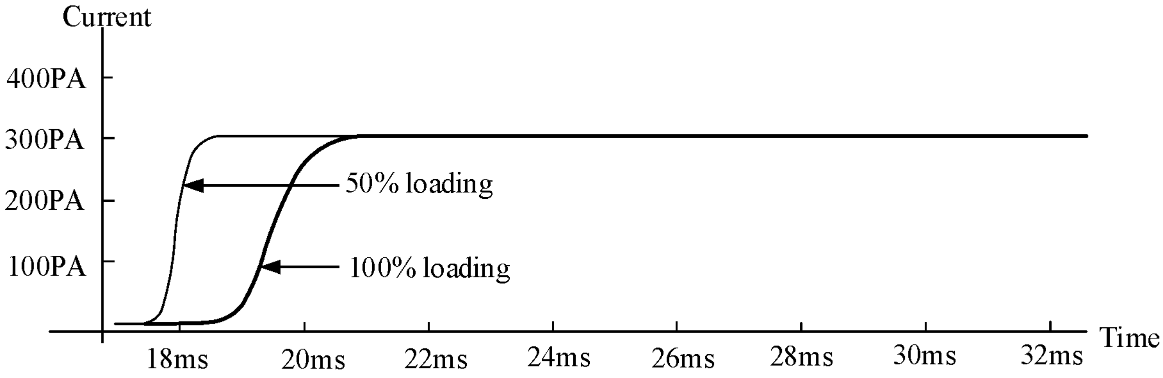
FIG. 8 is a simulation diagram of a time required for turning on a first light-emitting element according to an embodiment of the present disclosure.
Figure 9:
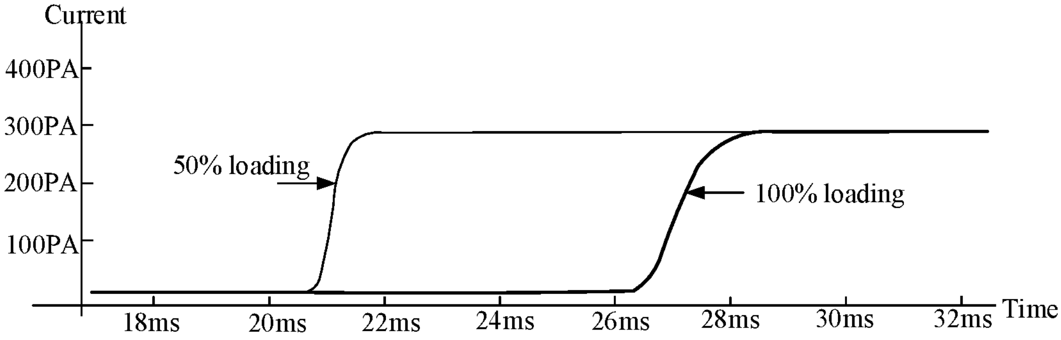
FIG. 9 is a simulation diagram of a time required for turning on another first light-emitting element according to an embodiment of the present disclosure.

FIG. 8 shows a simulation diagram of a time required for turning on the first light-emitting element 10 when the potential v3 of the second initial power source signal provided by the second initial power source signal terminal Vinit2 is −1.5 V and the loadings on the transparent conductive wire L1 are 50% loading (that is, c=0.75 pF and r=150 kΩ) and 100% loading (that is c=1.5 pF, and r=300 kΩ) respectively. FIG. 9 shows a simulation diagram of a time required for turning on the first light-emitting element 10 when the potential v3 of the second initial power source signal is −3 V and the loadings on the conductive wire L1 are 50% and 100% respectively. In FIGS. 8 and 9, both the horizontal axises represent the time in milliseconds (ms), and both the longitudinal axises represent the current in picoamps (pA). With reference to FIGS. 8 and 9, it can be seen that the current is 300 pA when the first light-emitting element 10 is turned on.

Comparing FIG. 8 with FIG. 9, it can be seen that when the potential of the second initial power source signal of −1.5 V is compared with the potential of the second initial power source signal of −3 V, no matter how large the loading on the conductive wire L1 is, the time required for turning on the first light-emitting element 10 is shorter. That is, the higher the potential of the second initial power source signal is, the shorter the turn-on time of the first light-emitting element 10 is. In addition, it can also be seen that when the potential of the second initial power source signal of −3 V is compared with the potential of the second initial power source signal of −1.5 V, a turn-on time difference of the first light-emitting element 10 between the 50% loading and 100% loading is larger. Thus, it can be determined that in the embodiment of the present disclosure, by setting the potential of the second initial power source signal to be higher than the potential of the first initial power source signal, the problem of turn-on delay caused by the influence of the parasitic capacitance on the conductive wire L1, i.e., the influence of the loading on the conductive wire L1, can be effectively improved.

Figure 10:
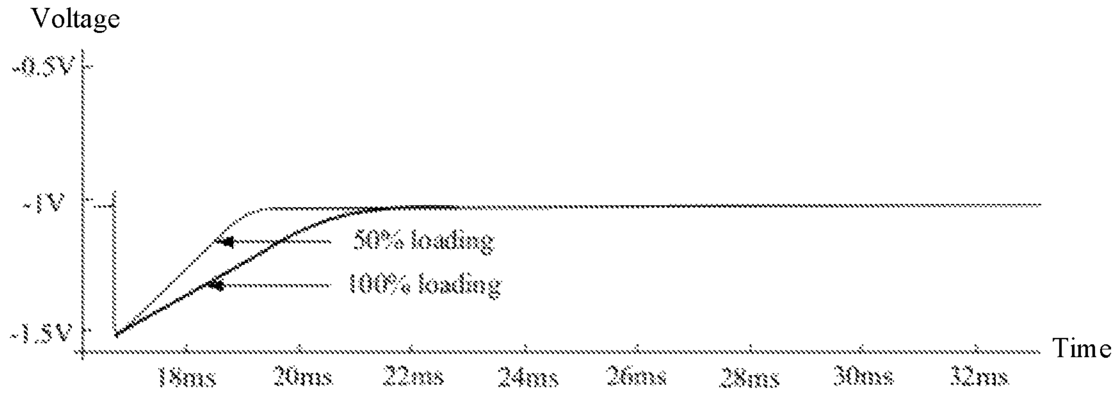
FIG. 10 is a simulation diagram of a time required for turning on a further first light-emitting element according to an embodiment of the present disclosure.
Figure 11:
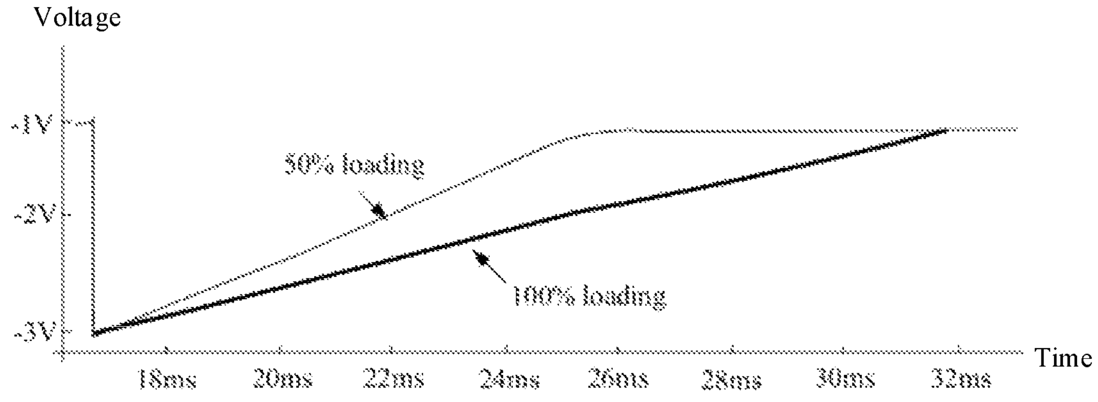
FIG. 11 is a simulation diagram of a time required for turning on a still further first light-emitting element according to an embodiment of the present disclosure.

FIG. 10 shows a simulation diagram that the potential of the anode of the first light-emitting element 10 reaches the potential required for turn-on when the potential v3 of the second initial power source signal is −1.5 V and the loadings on the conductive wire L1 are 50% loading and 100% loading respectively. FIG. 11 shows a simulation diagram that the potential of the anode of the first light-emitting element 10 reaches the potential required for turn-on when the potential v3 of the second initial power source signal is −3 V and the loadings on the conductive wire L1 are 50% loading and 100% loading respectively. In addition, in FIGS. 10 and 11, both the horizontal axises represent the time in milliseconds (ms), and both the longitudinal axises represent the potential of the anode of the first light-emitting element 10. In addition, it can be seen that the potential required for turn-on is −1 V.

Comparing FIG. 10 with FIG. 11, it can be seen that when the potential of the second initial power source signal of −1.5 V is compared with the potential of the second initial power source signal of −3 V, no matter how large the loading on the conductive wire L1 is, the more gentle the slope that the potential of the anode of the first light-emitting element 10 rises to (which may also referred to as "climb to") the potential −1V required for turn-on, the shorter the time. That is, the higher the potential of the second initial power source signal, the shorter the time when the potential of the anode of the first light-emitting element 10 may reach the potential required for turn-on. In addition, it can also be seen that when the potential of the second initial power source signal of −3 V is compared with the potential of the second initial power source signal of −1.5 V, a difference in time when the potential of the anode of the first light-emitting element 10 reaches the potential required for turn-on under 50% loading and 100% loading is larger. Thus, it can be seen therefrom that in the embodiment of the present disclosure, by setting the potential of the second initial power source signal to be higher than the potential of the first initial power source signal, that is, by setting the potential of the second initial power source signal to be higher, the potential of one end of the first light-emitting element 10 can quickly reach the potential required for turn-on. Correspondingly, a voltage difference between the two ends of the first light-emitting element 10 can quickly reach the turn-on voltage, thereby shortening the turn-on time of the first light-emitting element 10 and thus effectively improving the problem of turn-on delay.

In order to further embody the beneficial effects of the embodiment of the present disclosure, for the high-gray-scale picture, the low-gray-scale picture and a black-state picture, one sub-pixel (such a red sub-pixel) in the first light-emitting element 10 is simulated with the potential of the second initial power source signal being −1.5 V and −3 V. Reference may be made to table 1 to table 3 below for simulation results. Table 1 shows when the high-gray-scale picture is displayed and the loadings on the conductive wire L1 are 50% loading and 100% loading respectively, light-emitting currents when the first light-emitting element 10 emits light as well as the current difference percentage delta between the two. Table 2 shows when the low-gray-scale picture is displayed and the loadings on the conductive wire L1 are 50% loading and 100% loading respectively, light-emitting currents when the first light-emitting element 10 emits light as well as the current difference percentage delta between the two. Table 3 shows when the black-state picture is displayed and the loadings on the conductive wire L1 are 50% loading and 100% loading respectively, light-emitting currents when the first light-emitting element 10 emits light as well as the current difference percentage delta between the two.

TABLE 1

| Current (pA) | High-gray-scale picture | | |
|---|---|---|---|
| Vinit2 | 100% | 50% | delta |
| −3 V | 53.977 pA | 53.735 pA | −0.45% |
| −1.5 V | 54.122 pA | 53.839 pA | −0.52% |

TABLE 2

| Current (pA) | Low-gray-scale picture | | |
|---|---|---|---|
| Vinit2 | 100% | 50% | delta |
| −3 V | 113.64 pA | 195.68 pA | 72.19% |
| −1.5 V | 153.52 pA | 174.3 pA | 13.54% |

TABLE 3

| Current (pA) | Black-state picture | | |
|---|---|---|---|
| Vinit2 | 100% | 50% | delta |
| −3 V | 0.27984 pA | 0.27948 pA | −0.13% |
| −1.5 V | 0.5027 pA | 0.49634 pA | −1.27% |

With reference to table 1 above, it can be seen that when the high-gray-scale picture is displayed, under different loadings, the light-emitting current difference of the first light-emitting element 10 corresponding to any second initial power source signal is relatively small, is less than 2% as shown in Table 1 and meets a gamma standard. Thus, it can be determined that in the embodiment of the present disclosure, an increase in the potential of the second initial power source signal does not have any influence on the display of the high-gray-scale picture. That is, when the high-gray-scale picture is displayed, the light-emitting current of the first light-emitting element 10 may also meet a light-emitting current standard.

With reference to table 2 above, it can be seen that when the low-gray-scale picture is displayed, under different loadings, the light-emitting current difference of the first light-emitting element 10 corresponding to the second initial power source signal with a higher potential (such as −1.5 V) is smaller, such as 13.54% shown in table 2, and the light-emitting current difference of the first light-emitting element 10 corresponding to the second initial power source signal with a lower potential (such as −3 V) is larger, such as 72.19% shown in table 2. It can be determined that for the low-gray-scale picture, the illumination difference of the first light-emitting element 10 under different loadings can be made smaller by increasing the potential of the second initial power source signal, that is, better uniformity of gray-scale illumination may also be ensured.

With reference to table 3 above, it can be seen that when the black-state picture is displayed (which may be understood that no picture is displayed), under different loadings, the light-emitting current difference of the first light-emitting element 10 corresponding to any second initial power source signal is smaller. Thus, it can be determined that in the embodiment of the present disclosure, an increase in the potential of the second initial power source signal does not have any influence on the display of the black-state picture.

In addition, after the potential of the second initial power source signal is increased to −1.5V, under different loadings, the light-emitting current of the first light-emitting element 10 may also be less than 1p A and meets the black-state current standard (specific). It can also be determined that when the potential of the second initial power source signal is increased to −1.5 V, the voltage difference between the two ends of the first light-emitting element 10 cannot reach the turn-on voltage in the reset phase, and the light-emitting error will not occur.

Based on the above simulation table, it can be determined that by increasing the potential of the second initial power source signal, the normal display of any type of display picture (including the high-gray-scale picture, the low-gray-scale picture and the black-state picture) will not be affected, the better uniformity of illumination of the low-gray-scale picture may be ensured and the problem of turn-on delay may be improved.

Figure 12:
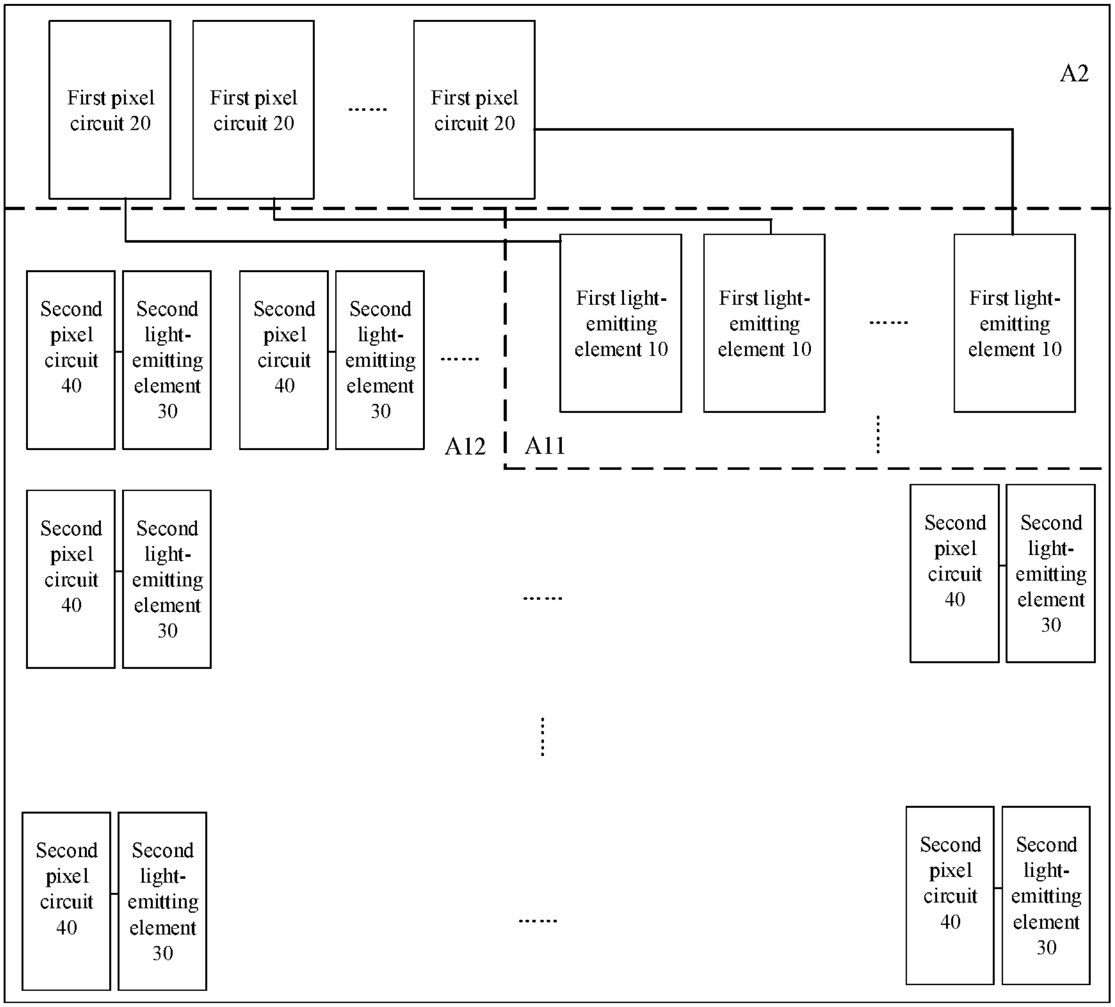
FIG. 12 is a structural schematic diagram of a further display panel according to an embodiment of the present disclosure.

Since the second display region A12 is a non-transparent display region, the pixel circuit that drives the light-emitting element in the second display region A12 may be located in the second display region A12, and there is no need to connect the pixel circuit and the light-emitting element through a conductive wire. For example, FIG. 12 shows a structural schematic diagram of a further display panel according to an embodiment of the present disclosure. As shown in FIG. 12, the display panel may further include a plurality of second light-emitting elements 30 in the second display region A12 and a plurality of second pixel circuits 40 in the second display region A12.

At least one of the plurality of second pixel circuits 40 may be connected with at least one of the plurality of second light-emitting elements 30, and an orthographic projection of the at least one second pixel circuit 40 on the base substrate 01 and an orthographic projection of the at least one second light-emitting element 30 connected with the at least one second pixel circuit 40 on the base substrate 01 may be at least partially overlapped with each other.

Or in the display panel, the plurality of second pixel circuits 40 may be in one-to-one correspondence with the plurality of second light-emitting elements 30 in terms of an electrical connection relationship. That is, each second pixel circuit 40 may be connected with one second light-emitting element 30 and the second light-emitting elements 30 connected with various second pixel circuits 40 are different.

Figure 13:
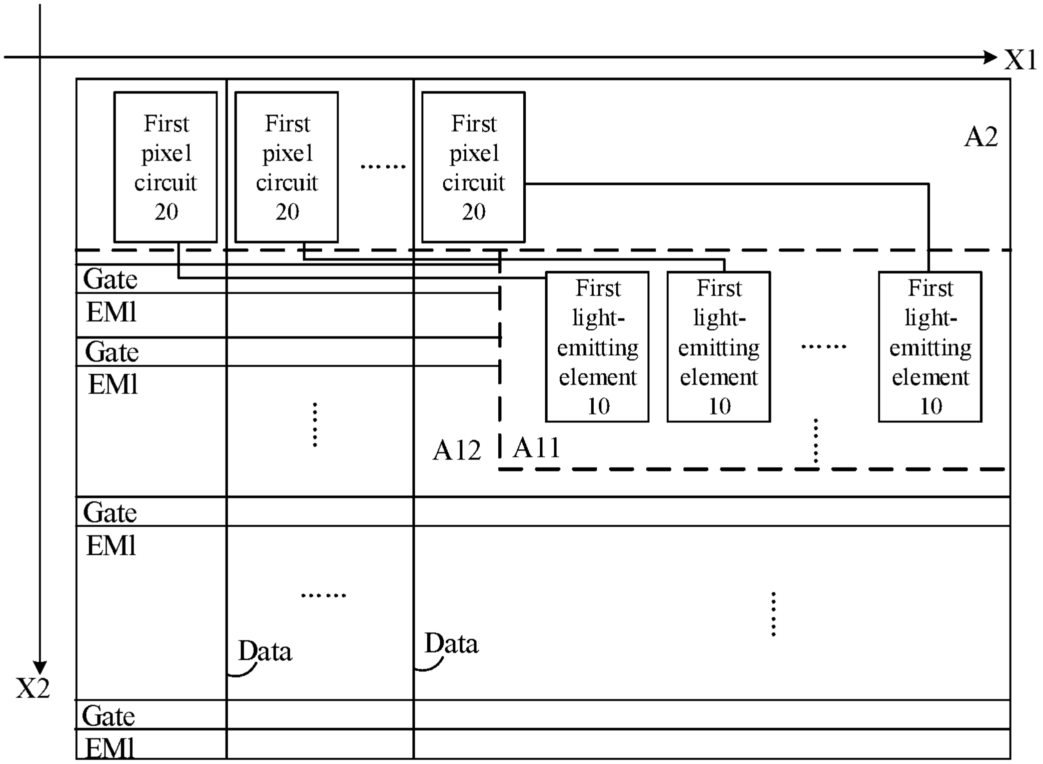
FIG. 13 is a structural schematic diagram of a still further display panel according to an embodiment of the present disclosure.

It should also be noted that for normally driving the display panel to operate, as shown in FIG. 13, the display panel also includes a plurality of driving signal lines extending in a first direction, such as a plurality of gate lines Gate and a plurality of light-emitting control lines EM1, which extend in the first direction X1, and a plurality of data lines Data extending along a second direction X2. The first direction X1 and the second direction X2 may be perpendicular to each other.

In conjunction with the first pixel circuit shown in FIG. 6, the gate line Gate may be connected with the gate signal terminal G1 and output the gate driving signal to the gate signal terminal G1. The data line Data may be connected with the data signal terminal D1 and output the data signal to the data signal terminal D1. The light-emitting control line EM1 may be connected with the light-emitting control signal terminal EM, and output the light-emitting control signal to the light-emitting control signal terminal EM.

In addition, for ensuring the light transmittance of the first display region A11, the plurality of driving signal lines are not located in the first display region A11, but only located in the second display region A12. In addition, the driving signal lines (e.g., Gate, EM1, and Data) on a different layer from the conductive wire L1 may be at least partially or completely overlapped with the conductive wire L1. The driving signal lines on the same layer as the conductive wire L1 are not overlapped with the conductive wire L1. In addition, for avoiding the influence of the conductive wire L1 on other driving signals, an orthographic projection of the conductive wire L1 on the base substrate 01 and an orthographic projection of a via region connecting different layers on the base substrate 01 may not be overlapped with each other.

Figure 14:
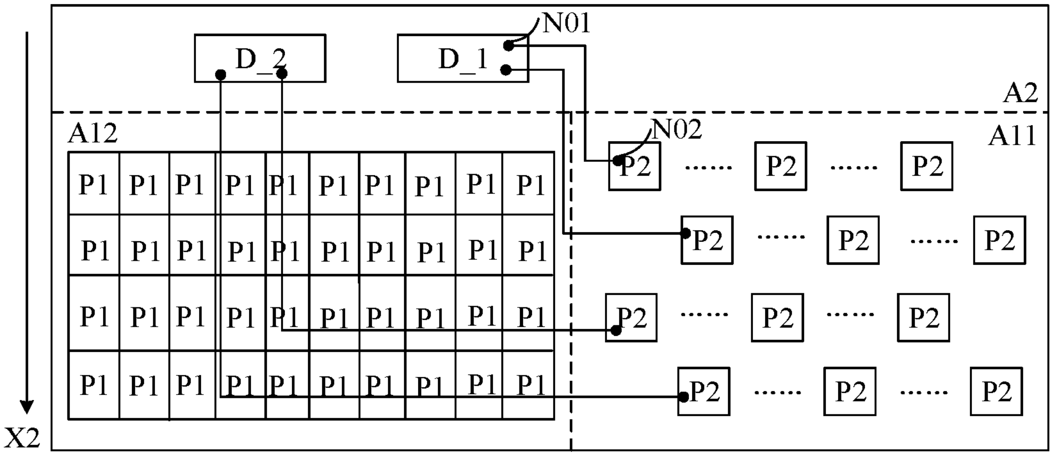
FIG. 14 is a structural schematic diagram of a still further display panel according to an embodiment of the present disclosure.

FIG. 14 shows a simplified diagram including a first display region A11, a pixel circuit region A2, and a second display region A12 by taking the display panel shown in FIG. 12 and FIG. 13 as an example. P1 refers to one second pixel circuit 40 and one second light-emitting element 30 connected therewith, D_1 and D_2 refer to the first pixel circuit 20, and P2 refers to the first light-emitting element 10. In addition, in conjunction with FIGS. 1 and 6, it can be seen that the target node N01 may be located in the pixel circuit region A2, and the node N02 may be located in the first display region A11.

Optionally, the second display region A12 includes a plurality of second light-emitting elements 30 and a plurality of second pixel circuits 40, while the first display region A11 only includes a plurality of first light-emitting elements 10, but does not include a plurality of first pixel circuits 20. Correspondingly, the plurality of first pixel circuits 20 are disposed in other regions other than the first display region A11. For example, the plurality of first pixel circuits 20 may be disposed in a pixel circuit region A2. Or the plurality of first pixel circuits 20 may be disposed in the second display region A12. Or part of the plurality of first pixel circuits 20 may be disposed in the pixel circuit region A2 and part of the plurality of first pixel circuits 20 may be disposed in the second display region A12.

It should be noted that in conjunction with the display panel shown in FIG. 13, if the plurality of second pixel circuits 20 are disposed in the pixel circuit region A2, the conductive wire L1 may firstly extend from the first display region A11 to the second display region A12, and then further extend from the second display region A12 to pixel circuit region A2. Or the conductive wire L1 may extend directly from the first display region A11 to the pixel circuit region A2 without passing through the second display region A12.

Then in conjunction with the display panel shown in FIGS. 12-14, it can also be seen that the pixel circuit region A2 and the second display region A12 may be arranged sequentially along an extending direction (i.e., the second direction X2) of a data line in the display panel. That is, the pixel circuit region A2 may be located in a region between the second display region A12 and a frame. With such an arrangement, a distance between the first pixel circuit 20 and the first light-emitting element 10 may be shorter. Correspondingly, it is not only convenient for wiring, but also can make the length of the disposed conductive wire L1 shorter. Further, the parasitic capacitance on the conductive wire L1 will be correspondingly smaller, thereby further solving the problem of turn-on delay.

Optionally, the second pixel circuit 40 according to the embodiment of the present disclosure may have the same structure as the first pixel circuit 20. That is, both the second pixel circuit 40 and the first pixel circuit 20 may adopt the double-Vinit structure as shown in FIG. 6. In this case, the better display effect of the second display region A12 may further be ensured. Or the second pixel circuit 40 may adopt a single-Vinit structure, that is, the second pixel circuit 40 is only connected with one initial power source terminal.

Optionally, for simplifying wiring and saving the cost, when the second pixel circuit 40 and the first pixel circuit 20 have the same structure, the first pixel circuit 20 and the second pixel circuit 40 may share the first initial power source terminal Vinit1 and the second initial power source terminal Vinit2. Or the first pixel circuit 20 and the second pixel circuit 40 may also be connected with different initial power source terminals (including the first initial power source terminal Vinit1 and the second initial power source terminal Vinit2), so that the driving circuit may flexibly control the potentials of the initial power source signals provided by the initial power source terminals connected with the pixel circuits in different display regions.

Optionally, for further ensuring the light transmittance in the first display region A11, the conductive wire L1 according to the above embodiment may be a transparent conductive wire. For example, the conductive wire L1 may be made of a transparent material such as indium tin oxide (ITO) or indium gallium zinc oxide (IGZO). It is assumed that the conductive wire L1 is made of ITO, the conductive wire L1 may also be called ITO wiring.

Figure 15:
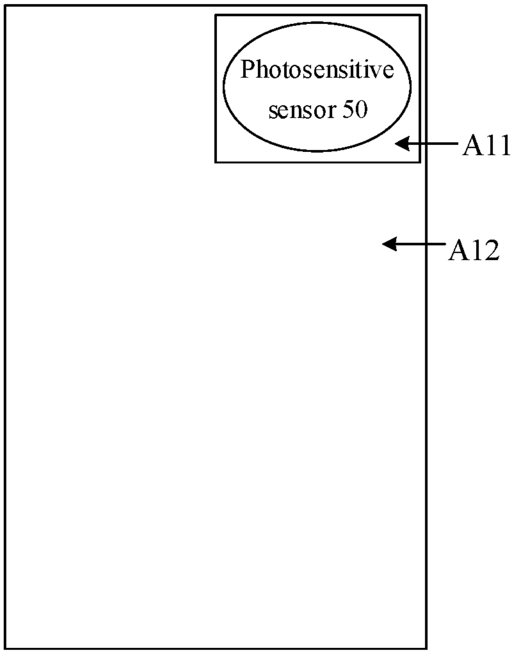
FIG. 15 is a structural schematic diagram of a still further display panel according to an embodiment of the present disclosure.

Optionally, with reference to a still further display panel shown in FIG. 15, the display panel may further include a photosensitive sensor 50 which may be located in the first display region A11. In this case, the photosensitive sensor does not need to additionally occupy the position of the non-display region, which is conducive to the narrow frame design of the display panel. If the photosensitive sensor is a camera assembly, the display panel may also be called a display panel with an under-screen camera.

Optionally, the light-emitting elements (including the first light-emitting element 10 and the second light-emitting element 30) according to the embodiment of the present disclosure may be electroluminescent (EL) devices.

In summary, the display panel according to the embodiment of the present disclosure includes the first light-emitting element in the first display region and the first pixel circuit which is connected with the first light-emitting element through the conductive wire and is configured to drive the first light-emitting element to emit light. Since the first pixel circuit is connected with the two initial power source terminals and the potential of the signal provided by the second initial power source terminal configured to reset the first light-emitting element is higher than the potential of the signal provided by the other initial power source terminal, before light emitting, the potential of one end of the first light-emitting element is higher than the potential when the second initial power source terminal is not disposed, and further during light emitting, the voltage difference between two ends of the first light-emitting element can quickly reach the turn-on voltage. In this case, the problem of light-emitting delay due to the influence of the parasitic capacitance on the conductive wire is solved and the risk of screen flickering is reduced.

Figure 16:
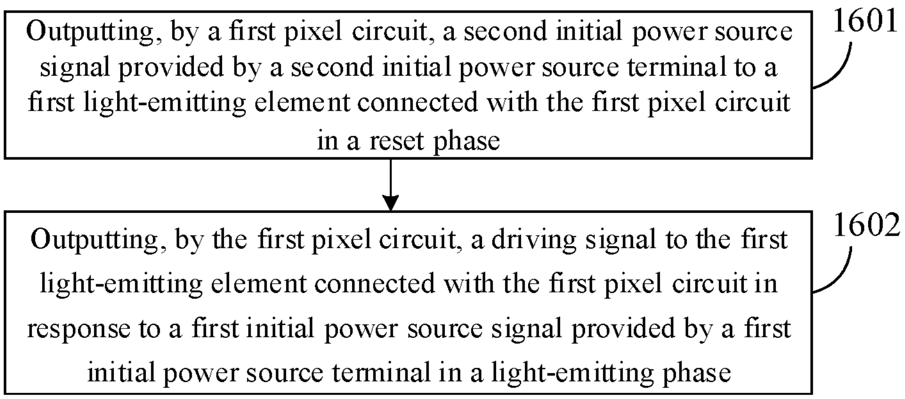
FIG. 16 is a flowchart of a method for driving a pixel circuit according to an embodiment of the present disclosure.

FIG. 16 is a flowchart of a method for driving a pixel circuit according to an embodiment of the present disclosure. The pixel circuit may be the first pixel circuit 20 in the display panel shown in the above figure. As shown in FIG. 16, the method may include the following steps.

In step 1601, the first pixel circuit outputs a second initial power source signal provided by a second initial power source terminal to a first light-emitting element connected with the first pixel circuit in a reset phase.

In step 1602, the first pixel circuit outputs a driving signal to the first light-emitting element connected with the first pixel circuit in response to a first initial power source signal provided by a first initial power source terminal in a light-emitting phase.

A potential of the second initial power source signal is higher than a potential of the first initial power source signal and lower than a turn-on voltage of the first light-emitting element.

In summary, the embodiment of the present disclosure provides the method for driving the pixel circuit. Since the first pixel circuit is connected with the two initial power source terminals and the potential of the initial power source signal provided by the second initial power source terminal configured to reset the first light-emitting element is higher than the potential of the signal provided by the other initial power source terminal, before light emitting, the potential of one end of the first light-emitting element is higher than the potential when the second initial power source terminal is not disposed, and further during light emitting, the voltage difference between two ends of the first light-emitting element can quickly reach the turn-on voltage. In this case, the problem of light-emitting delay due to the influence of the parasitic capacitance on the conductive wire is solved and the risk of screen flickering is reduced.

Optionally, as disclosed in the above device side, the second initial power source terminal Vinit2 may be an alternating current power source terminal or a direct current power source terminal. Correspondingly, the method according to the embodiment of the present disclosure may further include:

the second initial power source signal is provided to the second initial power source terminal in the reset phase and the light-emitting phase, where the second initial power source signal is a direct current signal; or the second initial power source signal is provided to the second initial power source terminal in the reset phase, where the second initial power source signal is an alternating current signal.

Figure 17:
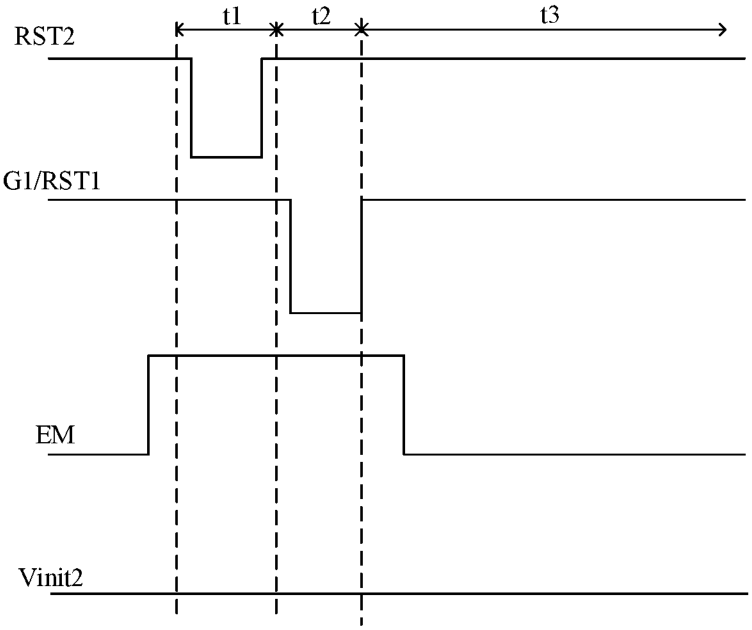
FIG. 17 is an operation time sequence diagram of a pixel circuit according to an embodiment of the present disclosure.
Figure 18:
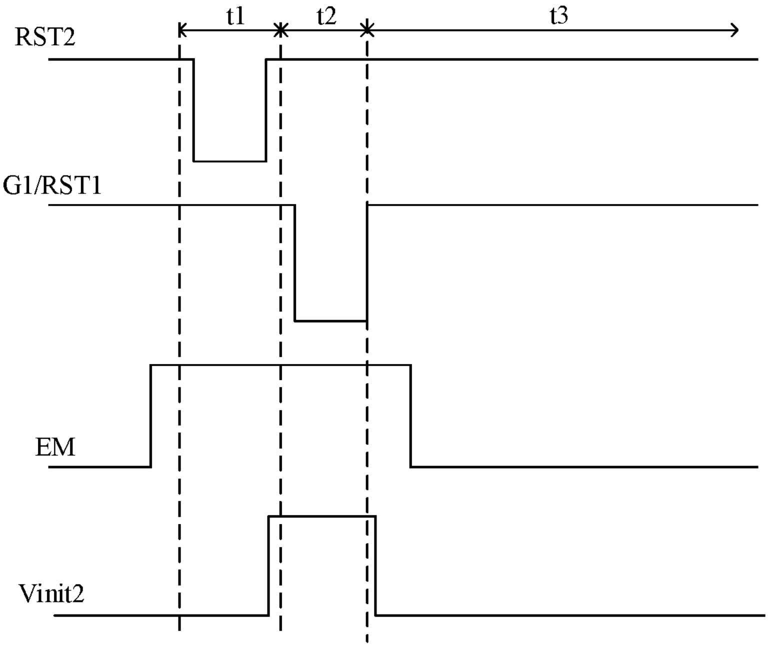
FIG. 18 is an operation time sequence diagram of another pixel circuit according to an embodiment of the present disclosure.

Taking that the first potential is a low potential relative to the second potential in the first pixel circuit 20 shown in FIG. 6 as an example, FIG. 17 shows an operation time sequence diagram of a first pixel circuit when the second initial power source terminal Vinit2 is the direct current power source terminal. FIG. 18 shows an operation time sequence diagram of a first pixel circuit when the second initial power source terminal Vinit2 is the alternating current power source terminal. In conjunction with FIGS. 17 and 18, it can be seen that an entire working process of the first pixel circuit includes three phases: "a pull-down phase t1", "a reset phase t2" and "a light-emitting phase t3".

In the pull-down phase t1, the potential of the pull-down control signal provided by the pull-down control terminal RST2 is the first potential. At this time, the pull-down transistor T2 may be turned on. The first initial power source terminal Vinit1 may output the first initial power source signal at the second potential to the second node N2 through the pull-down transistor T2 to achieve pull-down reset of the second node N2.

In the reset phase t2, the potential of the reset signal provided by the reset signal terminal RST1 and the potential of the gate driving signal provided by the gate signal terminal G1 are the first potential. At this time, the data writing transistor T1 and the reset transistor T7 may be turned on. The second initial power source terminal Vinit2 may output the second initial power source signal at the second potential to the target node N01 through the reset transistor T7 to achieve the reset of the target node N01. The data signal terminal D1 may output the data signal to the first node N1 through the data writing transistor T1 so as to charge the first node N1.

In the light-emitting phase t3, the potential of the light-emitting control signal provided by the light-emitting control signal terminal EM is the first potential. At this time, the light-emitting control transistors T4 and T5 are both turned on. The direct current signal terminal VDD may output the direct current power source signal to the first node N1 through the light-emitting control transistor T4. The driving transistor T6 may output a driving current to the third node N3 based on the potential of the first node N1 and the potential of the second node N2. Next, the driving current is output to the target node N01 through the light-emitting control transistor T5. When the potential of the target node N01 reaches the potential required for turn-on, the first light-emitting element 10 emits light.

FIG. 17 differs from FIG. 18 in that in FIG. 17, the potential of the second initial power source signal provided by the second initial power source terminal Vinit2 is constantly the required second potential (such as −1.5 V); and in FIG. 18, the potential of the second initial power source signal provided by the second initial power source terminal Vinit2 is constantly the required second potential only in the reset phase, and the potential of the second initial power source signal may be the same as the potential of the power source signal provided by the VSS terminal in the pull-down phase t1 and the light-emitting phase t3.

In summary, for the method for driving the pixel circuit according to the embodiment of the present disclosure, since the first pixel circuit is connected with the two initial power source terminals and the potential of the initial power source signal provided by the second initial power source terminal configured to reset the first light-emitting element is higher than the potential of the signal provided by the other initial power source terminal, before light emitting, the potential of one end of the first light-emitting element is higher than the potential when the second initial power source terminal is not disposed and further during light emitting, the voltage difference between two ends of the first light-emitting element can quickly reach the turn-on voltage. In this case, the problem of light-emitting delay due to the influence of the parasitic capacitance on the conductive wire is solved and the risk of screen flickering is reduced.

Figure 19:
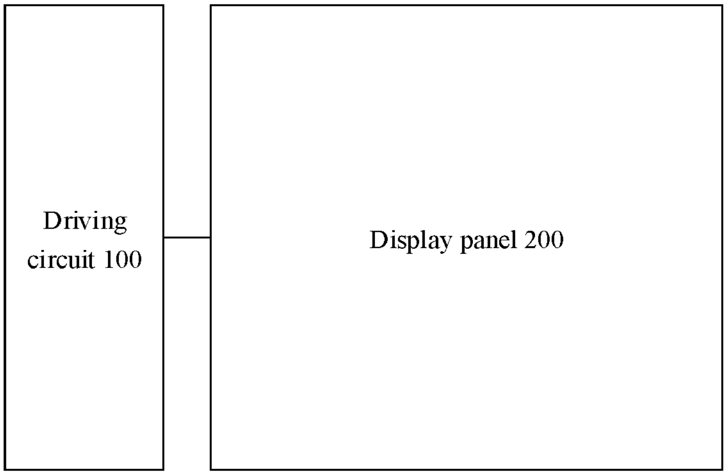
FIG. 19 is a structural schematic diagram of a display device according to an embodiment of the present disclosure.

Optionally, FIG. 19 is a structural schematic diagram of a display device according to an embodiment of the present disclosure. As shown in FIG. 19, the display device may include a driving circuit 100 and the display panel 200 as shown in any of FIGS. 1, 2 and 11-15. The display panel 200 includes a plurality of first pixel circuits.

The driving circuit may be connected with at least one of the plurality of first pixel circuits in the display panel 200 and may be configured to drive the at least one first pixel circuit to operate. In addition, the driving circuit 100 may also be connected with at least one second pixel circuit and drives the at least one second pixel circuit to operate. For example, the driving circuit 100 may be connected with the pixel circuits in the display panel 200 through various driving signal lines as shown in FIG. 13.

Optionally, the driving circuit 100 may further be configured to control the potential of the second initial power source signal provided by the second initial power source signal terminal connected with the first pixel circuit 20 based on a picture displayed by the display panel 200 currently. That is, the potential of the second initial power source signal may be adjusted dynamically. In this case, the driving flexibility is improved.

Optionally, the display device may be any product or component having a display function such as an organic light-emitting diode (OLED) display device, a liquid crystal display (LCD) display device, a mobile phone, a television or a display.

The above description is only optional embodiments of the present disclosure, and is not intended to limit the present disclosure. Any modifications, equivalent replacements, improvements and the like made within the spirit and principles of the present disclosure should be included within the scope of protection of the present disclosure.

What is claimed is:

1. A display panel, comprising:

a base substrate, wherein the base substrate comprises a display region and a non-display region on at least one side of the display region, the display region comprises a first display region and a second display region having a resolution higher than that of the first display region, and the non-display region comprises a pixel circuit region;

a plurality of first light-emitting elements in the first display region; and a plurality of first pixel circuits in the pixel circuit region, wherein orthographic projections of the plurality of first pixel circuits and orthographic projections of the plurality of first light-emitting elements on the base substrate are not overlapped with one another, wherein at least one of the plurality of first pixel circuits is connected with at least one of the plurality of first light-emitting elements through at least one conductive wire; the at least one first pixel circuit is connected with a first initial power source terminal and a second initial power source terminal respectively; the first initial power source terminal is configured to provide a first initial power source signal and the second initial power source terminal is an alternating current power source terminal and is configured to provide a second initial power source signal only in a reset phase so as to reset the first light-emitting element, and a potential of the second initial power source signal is the same as a potential of a power source signal Provided by a power source terminal connected with the first light-emitting element in other phase; and the potential of the second initial power source signal is higher than a potential of the first initial power source signal; and wherein an initial potential of an anode of the first light-emitting element is the potential of the second initial power source signal, the potential of the anode of the first light-emitting element rises constantly from the initial potential, and the first light-emitting element emits light when the potential of the anode of the first light-emitting element rises to a potential at which a voltage difference between the anode and a cathode reaches a turn-on voltage; and wherein and the potential of the second initial power source signal is lower than a turn-on voltage of the first light-emitting element;

the first initial power source terminal and the second initial power source terminal are shared such that only one of the first initial power source terminal and the second initial power source terminal is provided; and the potential of the second initial power source signal is dynamically adjusted based on a gray-scale value of a picture displayed currently, an adjusted potential of the second initial power source signal is negatively correlated with the gray-scale value of the picture displayed currently.

2. The display panel according to claim 1, wherein the at least one first pixel circuit is further connected with a gate signal terminal, a light-emitting control signal terminal, a direct current signal terminal, a data signal terminal, a pull-down control terminal and a reset signal terminal respectively; and the at least one first pixel circuit comprises a driving sub-circuit and a reset sub-circuit, the driving sub-circuit is connected with the gate signal terminal, the data signal terminal, the light-emitting control signal terminal, the direct current signal terminal, the pull-down control terminal, the first initial power source terminal and a target node respectively, and is configured to output a driving signal to the target node in response to a gate driving signal provided by the gate signal terminal, a data signal provided by the data signal terminal, a light-emitting control signal provided by the light-emitting control signal terminal, a direct current signal provided by the direct current signal terminal, a pull-down control signal provided by the pull-down control signal and the first initial power source signal, and the reset sub-circuit is connected with the reset signal terminal, the second initial power source terminal and the target node respectively, and is configured to output the second initial power source signal to the target node in response to a reset signal provided by the reset signal terminal; and the first light-emitting element is connected with the target node through the conductive wire.

3. The display panel according to claim 2, wherein the at least one first pixel circuit further comprises a compensating sub-circuit, and the compensating sub-circuit is connected with a voltage-stabilized power source terminal and the target node respectively, and is configured to compensate for a potential of the target node based on a voltage-stabilized signal provided by the voltage-stabilized power source terminal.

4. The display panel according to claim 3, wherein the compensating sub-circuit comprises a compensating capacitor, and one end of the compensating capacitor is connected with the target node, and the other end of the compensating capacitor is connected with the voltage-stabilized power source terminal.

5. The display panel according to claim 2, wherein the reset sub-circuit comprises a reset transistor, and a gate of the reset transistor is connected with the reset signal terminal, a first electrode of the reset transistor is connected with the second initial power source terminal, and a second electrode of the reset transistor is connected with the target node.

6. The display panel according to claim 2, wherein the driving sub-circuit comprises a data writing unit, a pull-down unit, a compensating unit, a storing unit, a light-emitting control unit, and a driving unit, the data writing unit is connected with the gate signal terminal, the data signal terminal and a first node respectively, and is configured to control an on-off state of the data signal terminal and the first node in response to the gate driving signal;

the pull-down unit is connected with the pull-down control terminal, the first initial power source terminal and a second node respectively, and is configured to control an on-off state of the first initial power source terminal and the second node in response to the pull-down control signal;

the compensating unit is connected with the gate signal terminal, a third node, and the second node respectively, and is configured to adjust a potential of the second node based on a potential of the third node in response to the gate driving signal;

the storing unit is connected with the direct current signal terminal and the second node respectively, and is configured to control the potential of the second node based on the direct current signal;

the light-emitting control unit is connected with the light-emitting control signal terminal, the direct current signal terminal, the first node, the third node, and the target node respectively, and is configured to control an on-off state of the direct current signal terminal and the first node as well as an on-off state of the third node and the target node in response to the light-emitting control signal; and the driving unit is connected with the second node, the first node, and the third node respectively, and is configured to output the driving signal to the third node based on the potential of the second node and a potential of the first node.

7. The display panel according to claim 6, wherein the data writing unit comprises a data writing transistor; the pull-down unit comprises a pull-down transistor; the compensating unit comprises a compensating transistor; the storing unit comprises a storing capacitor; the light-emitting control unit comprises a first light-emitting control transistor and a second light-emitting control transistor; and the driving unit comprises a driving transistor, a gate of the data writing transistor is connected with the gate signal terminal, a first electrode of the data writing transistor is connected with the data signal terminal, and a second electrode of the data writing transistor is connected with the first electrode;

a gate of the pull-down transistor is connected with the pull-down control terminal, a first electrode of the pull-down transistor is connected with the first initial power source terminal, and a second electrode of the pull-down transistor is connected with the second node;

a gate of the compensating transistor is connected with the gate signal terminal, a first electrode of the compensating transistor is connected with the third node, and a second electrode of the compensating transistor is connected with the second node;

one end of the compensating capacitor is connected with the second node, and the other end of the compensating capacitor is connected with the direct current signal terminal;

both a gate of the first light-emitting control transistor and a gate of the second light-emitting control transistor are connected with the light-emitting control signal terminal, a first electrode of the first light-emitting control transistor is connected with the direct current signal terminal and a second electrode of the first light-emitting control transistor is connected with the first node, a first electrode of the second light-emitting control transistor is connected with the third node, and a second electrode of the second light-emitting control transistor is connected with the target node; and a gate of the driving transistor is connected with the second node, a first electrode of the driving transistor is connected with the first node and a second electrode of the driving transistor is connected with the third node.

8. The display panel according to claim 1, further comprising:

a plurality of second light-emitting elements in the second display region; and a plurality of second pixel circuits in the second display region, wherein at least one of the plurality of second pixel circuits is connected with at least one of the plurality of second light-emitting elements, and orthographic projections of the at least one second pixel circuit and orthographic projections of the at least one second light-emitting element on the base substrate are at least partially overlapped with each other.

9. The display panel according to claim 8, wherein the at least one first pixel circuit and the at least one second pixel circuit share the first initial power source terminal.

10. The display panel according to claim 9, wherein the at least one first pixel circuit and the at least one second pixel circuit share the second initial power source terminal.

11. The display panel according to claim 1, wherein the pixel circuit region and the second display region are arranged sequentially along an extending direction of a data line in the display panel.

12. The display panel according to claim 1, wherein the conductive wire is a transparent conductive wire and is made of an indium tin oxide material.

13. The display panel according to claim 1, further comprising a photosensitive sensor, wherein the photosensitive sensor is located in the first display region.

14. The display panel according to claim 7, wherein the at least one first pixel circuit further comprises a compensating sub-circuit, which is connected with the voltage-stabilized power source terminal and the target node respectively and is configured to compensate for a potential of the target node based on the voltage-stabilized signal provided by the voltage-stabilized power source terminal; the compensating sub-circuit comprises a compensating capacitor, one end of the compensating capacitor is connected with the target node and the other end of the compensating capacitor is connected with the voltage-stabilized power source terminal; and the reset sub-circuit comprises a reset transistor, a gate of the reset transistor is connected with the reset signal terminal, a first electrode of the reset transistor is connected with the second initial power source terminal and a second electrode of the reset transistor is connected with the target node;

the display panel further comprises a plurality of second light-emitting elements in the second display region and a plurality of second pixel circuits in the second display region, wherein at least one of the plurality of second pixel circuits is connected with at least one of the plurality of second light-emitting elements, orthographic projections of the at least one second pixel circuit and orthographic projections of the at least one second light-emitting element on the base substrate are at least partially overlapped with each other, and the at least one first pixel circuit and the at least one second pixel circuit share the first initial power source terminal and share the second initial power source terminal;

the pixel circuit region and the second display region are arranged sequentially along an extending direction of a data line in the display panel; the conductive wire is a transparent conductive wire and is made of an indium tin oxide material; and the display panel further comprises a photosensitive sensor, wherein the photosensitive sensor is located in the first display region.

15. A method for driving a pixel circuit, wherein the pixel circuit is the first pixel circuit in the display panel according to claim 1, and the method comprises:

outputting, by the first pixel circuit, a second initial power source signal provided by a second initial power source terminal to a first light-emitting element connected with the first pixel circuit in a reset phase; and outputting, by the first pixel circuit, a driving signal to the first light-emitting element connected with the first pixel circuit in response to a first initial power source signal provided by a first initial power source terminal in a light-emitting phase, wherein a potential of the second initial power source signal is higher than a potential of the first initial power source signal and lower than a turn-on voltage of the first light-emitting element.

16. The method according to claim 15, further comprising:

providing the second initial power source signal to the second initial power source terminal in the reset phase and the light-emitting phase, wherein the second initial power source signal is a direct current signal; or providing the second initial power source signal to the second initial power source terminal in the reset phase, wherein the second initial power source signal is an alternating current signal.

17. A display device, comprising a driving circuit and the display panel according to claim 1, wherein the display panel comprises a plurality of first pixel circuits; and the driving circuit is connected with at least one of the plurality of first pixel circuits and is configured to drive the at least one first pixel circuit to operate.

18. The display device according to claim 17, wherein the driving circuit is further configured to control a potential of a second initial power source signal provided by a second initial power source signal terminal connected with the at least one first pixel circuit based on a picture displayed by the display panel currently.

* * * * *